United States Patent
Li et al.

(10) Patent No.: US 10,957,905 B2
(45) Date of Patent: Mar. 23, 2021

(54) POROUS SILICON FLAKE ANODE MATERIAL FOR LI ION BATTERIES

(71) Applicant: Unimaterial Technologies, LLC, Austin, TX (US)

(72) Inventors: Yunjun Li, Austin, TX (US); Igor Pavlovsky, Leander, TX (US); Mohshi Yang, Austin, TX (US)

(*) Notice: Subject to any disclaimer, the term of this patent is extended or adjusted under 35 U.S.C. 154(b) by 21 days.

(21) Appl. No.: 16/176,455

(22) Filed: Oct. 31, 2018

(65) Prior Publication Data
US 2019/0198868 A1 Jun. 27, 2019

Related U.S. Application Data (60) Provisional application No. 62/580,534, filed on Nov. 2, 2017.

(51) Int. Cl.
| | | |
|---|---|---|
| H01M 4/38 | (2006.01) | |
| H01M 10/0525 | (2010.01) | |
| H01M 4/587 | (2010.01) | |
| H01M 4/36 | (2006.01) | |
| H01M 4/02 | (2006.01) | |

(52) U.S. Cl.
CPC ........... *H01M 4/386* (2013.01); *H01M 4/366* (2013.01); *H01M 4/587* (2013.01); *H01M 10/0525* (2013.01); *H01M 2004/021* (2013.01); *H01M 2004/027* (2013.01)

(58) Field of Classification Search
USPC ......................................................... 429/231
See application file for complete search history.

(56) References Cited

U.S. PATENT DOCUMENTS

| | | | |
|---|---|---|---|
| 9,748,573 B2* | 8/2017 | Yang | H01M 4/364 |
| 10,622,624 B2* | 4/2020 | Son | H01M 4/364 |
| 2010/0310941 A1* | 12/2010 | Kumta | H01M 10/0525 429/231.95 |
| 2011/0287317 A1* | 11/2011 | Nakanishi | H01M 4/364 429/218.1 |
| 2013/0108923 A1* | 5/2013 | Nakanishi | H01M 10/0525 429/217 |
| 2016/0308205 A1* | 10/2016 | Canham | H01M 4/0404 |
| 2017/0352883 A1* | 12/2017 | Cho | H01M 4/38 |
| 2018/0145316 A1* | 5/2018 | Moon | H01M 4/386 |

FOREIGN PATENT DOCUMENTS

WO    WO-2018156775 A1 *   8/2018   ............. C09K 13/04

* cited by examiner

*Primary Examiner* — Nina Bhat
(74) *Attorney, Agent, or Firm* — Cotman IP Law Group (57) ABSTRACT

A silicon based material in the form of sheet-like silicon porous particles in an electrically conductive material matrix wherein said silicon particles contain nano-sized pores, and a method of producing thereof, are disclosed. The material and the method allow obtaining Li ion batteries with high electric charge capacity and improved cycling performance of the battery anode.

18 Claims, 7 Drawing Sheets

POROUS SILICON FLAKE ANODE MATERIAL FOR LI ION BATTERIES

This application claims priority to U.S. Provisional Patent Application Ser. No. 62/580,534 filed on Nov. 2, 2017 which is incorporated by reference herein.

TECHNICAL FIELD

The invention relates to Li ion battery anode materials, and more particularly to high capacity Li ion battery anode materials incorporating porous silicon flake particles.

BACKGROUND

Li ion batteries are one of the major types of rechargeable batteries currently on the market. These batteries have high volumetric energy density exceeding 250 Wh/L and discharge efficiency up to 90%. However, energy storage solutions with higher capacity are in high demand by electric vehicle industry and especially for residential energy storage. High capacity energy storage together with the solar power generation would form a new paradigm for residential power generation in the near future.

One of the ways to increase the capacity of Li ion batteries is to add silicon to the currently used graphite based anode (negative) electrode material. Each silicon atom can bind up to 4.4 Li atoms as opposed to only one Li atom per 6 carbon atoms for the fully lithiated state of the graphite based Li ion batteries, a de facto standard in Li ion battery industry. Maximum theoretical specific capacity of Si based battery is a factor of 10 or greater than that with the graphite based electrode.

However, such significant uptake of Li ions by Si atoms results in a 320% increase in the original volume of the anode. This results in fractures and crumbling of the Si material following by the loss of contact with the current collector. As a result, the battery loses most of its initial capacity during a few initial charge-discharge cycles. For example, pulverization of Si microparticles encapsulated in acetylene black was reported in [C.-Y. Chen et al., In situ Scanning Electron Microscopy of Silicon Anode Reactions in Lithium-Ion Batteries during Charge/Discharge Processes, Sci. Rep. 6, 36153; (2016)]. The authors also reported that due to the repeated lithiation a Si nanoparticle aggregate suffered exfoliation and partial loss of electrical contact. Instead, Si nanoflakes (100 nm thick, 4-5 um lateral size) have shown better reversibility and cycling characteristics of the anode.

Good results have been achieved with Si nanoflakes laminated with Cu or Ni layers. This type of lamination showed improved cycling and discharge capacity of the anode material [M. Saito et al. Si thin platelets as high-capacity negative electrode for Li-ion batteries. Journal of Power Sources 196 (2011) 6637-6643]. The disclosed methods of making those Si nanoflakes, however, are very expensive and not practical for mass production. Moreover, the nature of those nanoflakes is amorphous and they are easily distorted and prone to swelling during charge/discharge, still resulting in large volume changes during cycling.

Finding a solution to mitigate significant volume changes in the Si based Li batteries is critical for the success of this technology. A few solutions have been proposed to solve the volume swelling problem.

Silicon nanowires have been proposed as an alternative lithiated material [C. K Chan, et al., "High-performance Lithium Battery Anodes using Silicon Nanowires", Nat. Nanotechnol. 3, 31-35 (2008)]. The material was supposed to provide current pathways to mitigate the loss of electrical contact throughout the anode. However, the nanowires would have to be doped to have a sufficient density of charge carriers, which is problematic in 1D nanoscale. Secondly, the swelling issue would still exist, and, in fact, could still pose a degradation issue for the anode.

Another approach was to use Si nanoparticles. Though nanoparticles are prone to cracking issues during volume expansion, the volume increase is still significant [X. H. Liu et al. Size-Dependent Fracture of Silicon Nanoparticles During Lithiation. ACS Nano, 6, 1522-1531 (2012)]. The electrical contact issues are not resolved in nanoparticle based anodes either.

Finally, silicon thin film technologies are cost prohibitive and not suitable for high capacity industrial and residential energy storage applications.

Porous silicon powders were also investigated to be silicon based anodes for lithium ion batteries anode materials for avoiding stability issues [Chenfei Shen, et al., Nano Energy, 19, 68-77(2016)]. The disclosed porous silicon powders were either spherical [Qiangfeng Xiao, et al., Nature Communications, 6, 8844 (2015)] or irregular.

BRIEF SUMMARY

We disclose a silicon based anode material in the form of sheet-like silicon porous particles in an electrically conductive material matrix wherein said silicon particles contain nano-sized pores. The 2-dimensional (2-D) sheet-like and porous silicon particles have a thickness ranging from 10 nm to 300 nm with the lateral size from 50 nm to 4 µm. Preferably, the thickness of silicon sheets ranging from 20 nm to 100 nm and the lateral size from 30 nm to 500 nm.

The nano-sized pores in the silicon sheets can extend through the sheets from one side to another side or throughout the silicon sheets. The pore size can vary from 1 nm to 100 nm. More preferably, the pore size varies from 1 nm to 50 nm. The volume of pores in 2-dimensional Si powders is sufficient enough to accommodate Li ions during the lithiation process (formation of $Li_{4.4}Si$) such that the lithiated silicon particle will have a volume comparable with the volume of initial, unlithiated silicon particle (see a schematic drawing in FIG. 1).

Moreover, 2-D sheet-like silicon particles tend to have higher packing density when they are compressed, if compared with 1-D and spherical particles. This leads to higher mass density of silicon anode and smaller thickness of silicon anode in an actual lithium battery design, thus producing higher volumetric density for a full cell lithium ion battery.

DETAILED DESCRIPTION

Obtaining 2-D Silicon Powders

The sheet-like silicon particles are fabricated after the raw silicon particles are produced from an initial or starting crystalline silicon material and are available in a powder or slurry form. The initial silicon powders can be produced by high energy ball milling of crystalline silicon materials or extracted from sawdust collected from cutting silicon ingots or silicon blocks. The initial silicon ingot or the silicon blocks can be monocrystalline or multi-crystalline silicon doped with phosphor or boron or gallium elements for making either n-doped or p-doped silicon wafers in semiconductor and solar industry. Preferably, the initial crystalline silicon powders is monocrystalline with a <111>, or <110>, or <100> crystalline facet.

The doping level of initial or starting silicon materials can vary from ~$10^5$ to ~$10^{21}/cm^3$. The sheet resistivity of initial or starting silicon materials can vary from ~100 Ω·cm to ~$10^{-4}$ Ωcm. Both the ball-milling process and the starting silicon materials are crucial to produce 2-dimensional sheet-like silicon particles. The liquid medium for milling can be water or solvents. Preferably, solvents are used to produce sheet-like silicon powders. Solvents can be polar or non-polar, but preferably polar solvents should be used. Preferably, the solvent is alcohol, or acetate, or ether, or their aqueous solutions.

In one example, a mixture of 75 parts of 2-propanol and 25 parts of butyl acetate can be used as a liquid medium to produce sheet-like silicon particles by high energy milling of monocrystalline p-type silicon powders with particle size from 0.2 μm to 10 μm. The monocrystalline p-type silicon powders can be made by crushing p-doped monocrystalline silicon ingots or trimmed silicon from ingots. The monocrystalline p-type silicon powders can also be collected from purified silicon sawdust waste or silicon sludge produced while cutting p-type monocrystalline silicon ingots with diamond wires. The purified silicon sawdust waste contains silicon powders with particle size from 0.1 μm to 50 μm. The high energy ball milling creates a high sheer force on monocrystalline powders to cleave nano-layered sheet-like silicon off from monocrystalline silicon powder particles. This micromechanical cleavage process produces 2-D sheet-like silicon powders. The nano-layered sheet-like silicon may still keep <111>, or <110>, or <100> oriented silicon facets.

Figure 1:
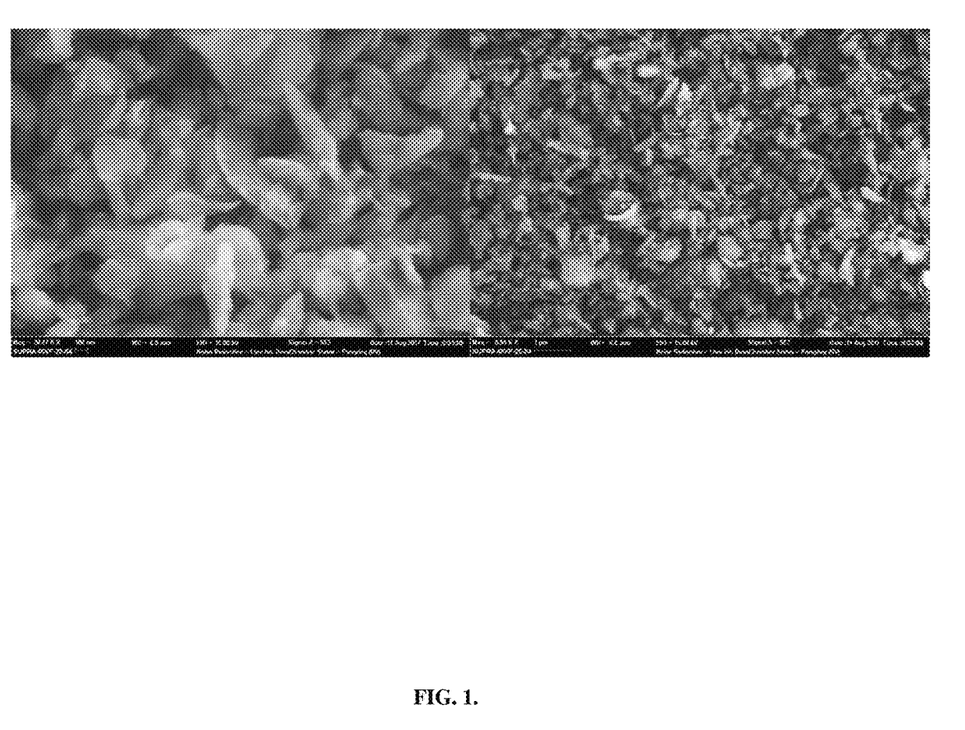
FIG. 1. 2-D sheet-like silicon powder
FIG. 2. Porosity of Si particles having different shapes. Cross-sectional view.

After the sheet-like silicon powders are produced by high energy milling process, the obtained mixture is then baked to dry to obtain sheet-like silicon powders having a sheet thickness ranging from 10 nm to 300 nm with the lateral size from 50 nm to 1 μm (FIG. 1).

Sheet-like silicon powders have a relatively large surface area. A chemical etching (also called as stain etching) process is used to create nano-pores in the 2-D sheet-like silicon powders.

Examples of typical stain etching solution recipes are listed below.
1. HF:HNO3:H$_2$O:2-propanol=1:5:10:0.3
2. HF: 5M, AgNO$_3$:0.02M
3. HF: 5M, Fe(NO$_3$)$_3$:0.02M:
4. HF: 5M, Cu (NO$_3$)2:0.03M Silicon in the form of a powder is added to an etching solution, and the etching reaction typically takes from one minute to a few hours. The prepared stain etched silicon is then filtered out using a centrifuge and rinsed to eliminate traces of acids and metal ions.

Figure 2:
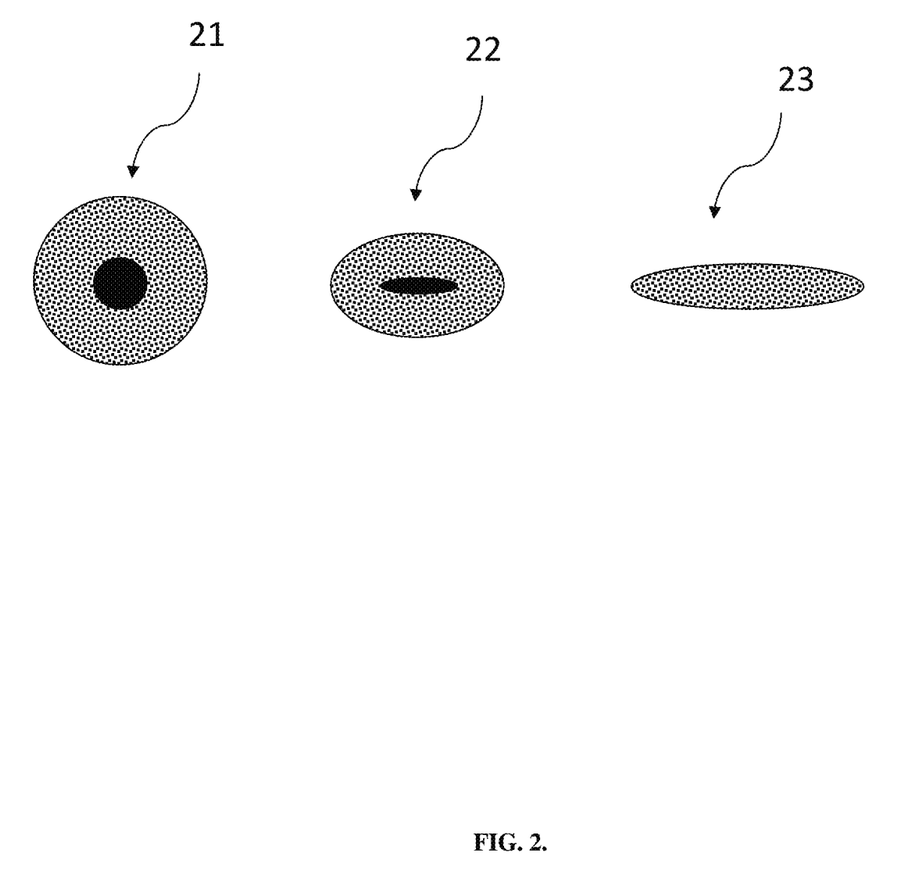

The pores created by etching are made preferentially throughout the entire volume of silicon particles, as shown in FIG. 2, and not only on the surface of the particles. Thus, in a preferred embodiment, the initial powder material contains silicon particles in the form of sheets in which the pores created across the sheets make the material porous more efficiently since the porosity of the material usually decreases with the etch depth. The silicon sheets withstand the lithiation deformation stress more efficiently since the particle expansion will occur along with a stress relaxation over higher surface area. The preferred thickness of silicon sheets is less than 150 nm.

Figure 3:
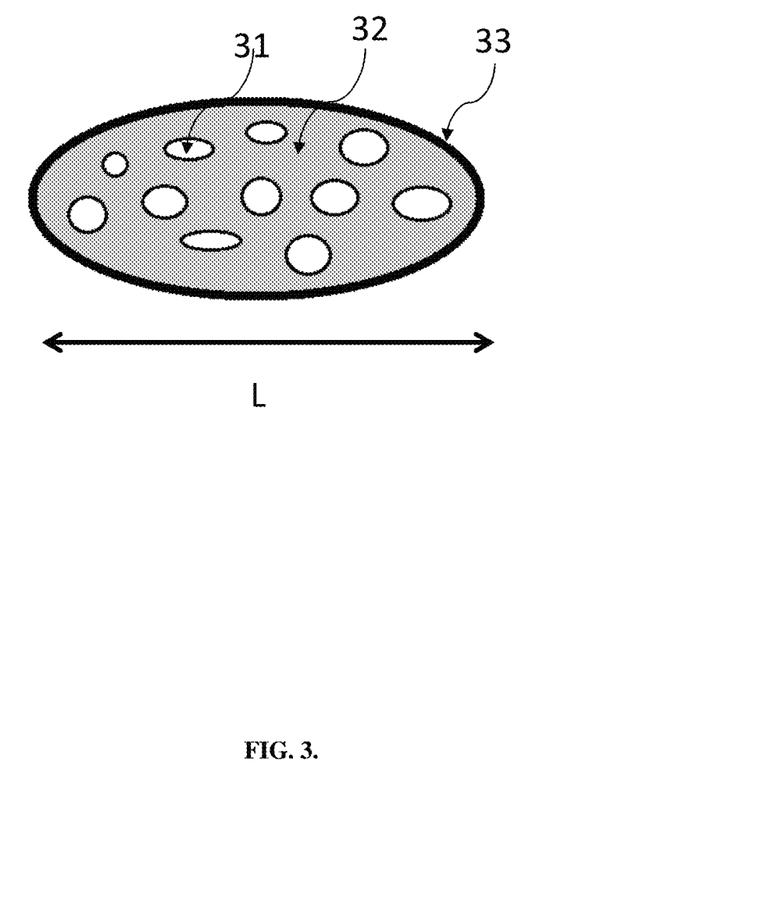
FIG. 3. Porosity in 2-D silicon sheet.

FIG. 3 describes the created pores in one 2-D silicon sheet. The feature size of the pores ranges typically from 2 nm to 50 nm. The lateral length of Si sheets ranges from 50 nm to a few micrometers. The density of nano-sized pores can be adjusted so that the Si sheets will not be pulverized during lithiation and de-lithiation cycling.

The preferred initial silicon material is a doped monocrystalline silicon which can be stain etched more readily than an undoped silicon since it is known in the art that the silicon etching process involves formation of an etchant—semiconductor interface. The initial silicon material can be a purified waste silicon sawdust powder. Polycrystalline silicon is the second preferred material.

Chemical Modification of 2-D Silicon Powders

Figure 4:
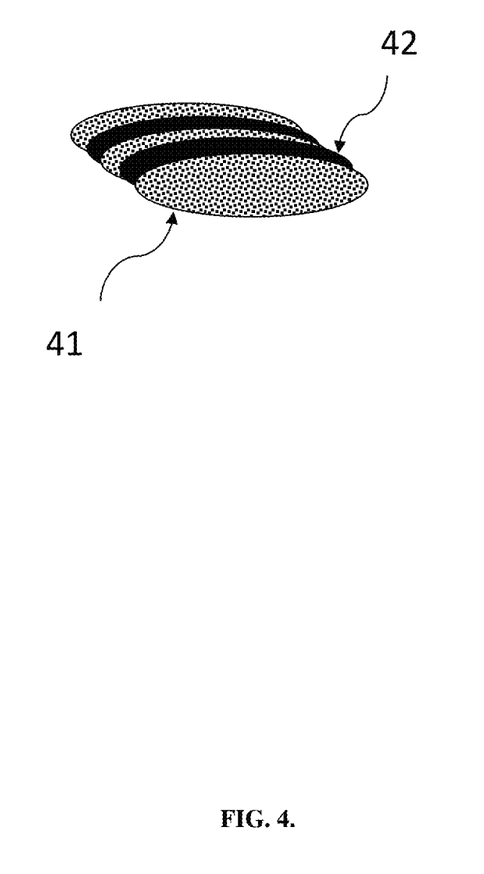

In a preferred silicon based Li battery anode material composition, addition of a carbonaceous conducting material is usually practiced to facilitate charge transfer and, in a lesser extent, for lithiation (Li ions storage at the carbon surface). It is further preferred that silicon particles in the form of flakes are mixed with carbonaceous particles in the form of flakes or fibers having the thickness (diameter) not exceeding 150 nm. The silicon-carbon anode material composition will have a preferential layered sandwiched structure wherein silicon and carbon flakes form layers (FIG. 4). The carbonaceous material is further preferred to be a graphitic type to ensure lower electrical resistivity.

The other advantage of the porous silicon particle material over non-porous Si particles is that the carbonaceous conductor can be arranged to be substantially inserted into the pores. A preferred embodiment of this structure is a plurality of carbon nanotubes or carbon fibers located in Si particle pores and protruding from the Si particles surface to further create interconnects with nanotubes and nanofibers from the surrounding Si particles as well as interconnects with the electron current collector. It is preferable that the diameter of the nanotubes is less than the average diameter of pores in Si particles, and the length of the protruded nanotubes is on the order of the distance between nearby Si particles.

Figure 5:
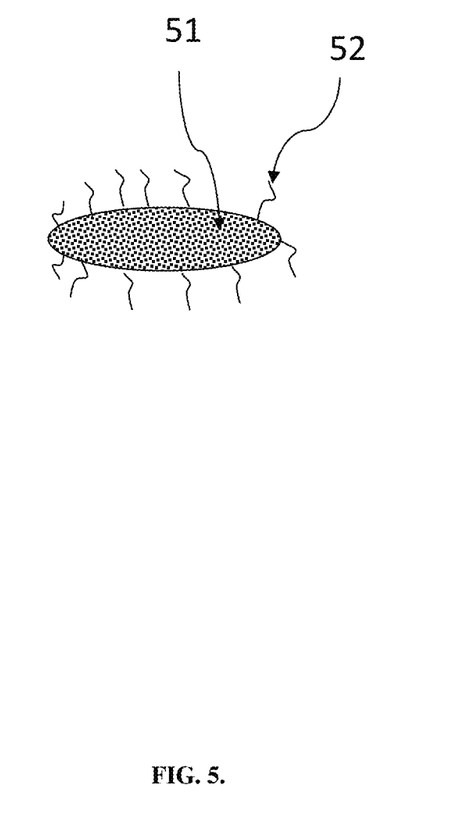

It is further disclosed that the carbon nanotubes or nanofibers can be grown directly on the surface of Si particles. The carbon nanotube growth method can be, for example, a physical vapor deposition or chemical vapor deposition (CVD) method in a carbon precursor based gas media at high temperature and low pressure (see FIG. 5). One example of such technique is to grow carbon nanotubes at a temperature of approximately 700° C. in ethylene-hydrogen gas mixture at a pressure of 100 Torr. A plurality of catalytic nanoparticles formed using a Fe(NO$_3$)$_3$ solution may be deposited over Si particles surface or within the pores of the Si particles to facilitate growth of carbon nanotubes or graphitic carbon or nanofibers for interconnects. The carbon nanotube or graphitic carbon coated porous silicon is an electrically conductive material.

It is further disclosed that 2-D porous silicon powders can be mixed with polymer materials that will convert to a carbonized conductive graphitic material after a heat-treatment in inert gas environment. The polymer materials can be cellulose or other polymers that can form graphitic material with porous silicon powders. The polymers heat treatment temperature can range from 900° C. to 1100° C.

It is further disclosed that a chemical vapor deposition (CVD) process can be used to grow graphene on porous silicon powder particle surface. Carbon precursors can be chosen from methane, acetylene, nature gas, carbon monoxide. The CVD graphene growth temperature can range from 650° C. to 1100° C.

It is further disclosed that the 2-D porous silicon powders can form metal-silicon composite powders to increase the conductivity of initial silicon powders. In an example embodiment, aluminum powders are firstly mixed with 2-D porous silicon powders. Then the well mixed powders are heat-treated in an inert gas furnace to produce silicon-aluminum composite powders. The heat treatment temperature of this process can range from 500° C. to 600° C. The aluminum weight percentage of mixing ratio can range from 5% to 30%. The porous silicon-aluminum composite powders can have better electrical conductivity to produce silicon anode materials for lithium ion battery.

In addition to the disclosed above, the silicon based anode material for Li ion batteries may further contain a binder. Binders such as PVDF, EPDM, Nafion, carboxymethyl cellulose, polyacrylic acid and others, are critical to the performance and durability of the Li ion batteries since the binder keeps the integrity of electrodes and maintains the conductive path to the current collector.

2-D silicon Example 1. 2-D silicon powders 1 (<400 nm) is mixed with conductive carbon black (CB) and carbon nanotubes (CNT) as a conductive additive (2.5 wt %), and neutralized polyacrylic acid (PAA) as binder (7.5 wt %). The prepared paste material is then printed onto a copper foil using a coating machine to achieve a wet thicknesses from 20 μm to 120 μm. The prepared sheet electrode is then subsequently dried in vacuum or in air. Next, the electrodes are placed in a vacuum oven heated to 110° C. and left in the oven overnight. After cooling, the printed electrodes are moved to an argon filled glove box. The silicon loading in the electrodes can be either 1.0 to 1.1 mg/cm$^2$ for the rate capability measurements or 0.6 to 0.8 mg/cm$^2$ for the limited capacity cycling. The electrode thickness without copper foil is between 20 μm to 30 μm depending on the silicon mass loading.

Figure 6:
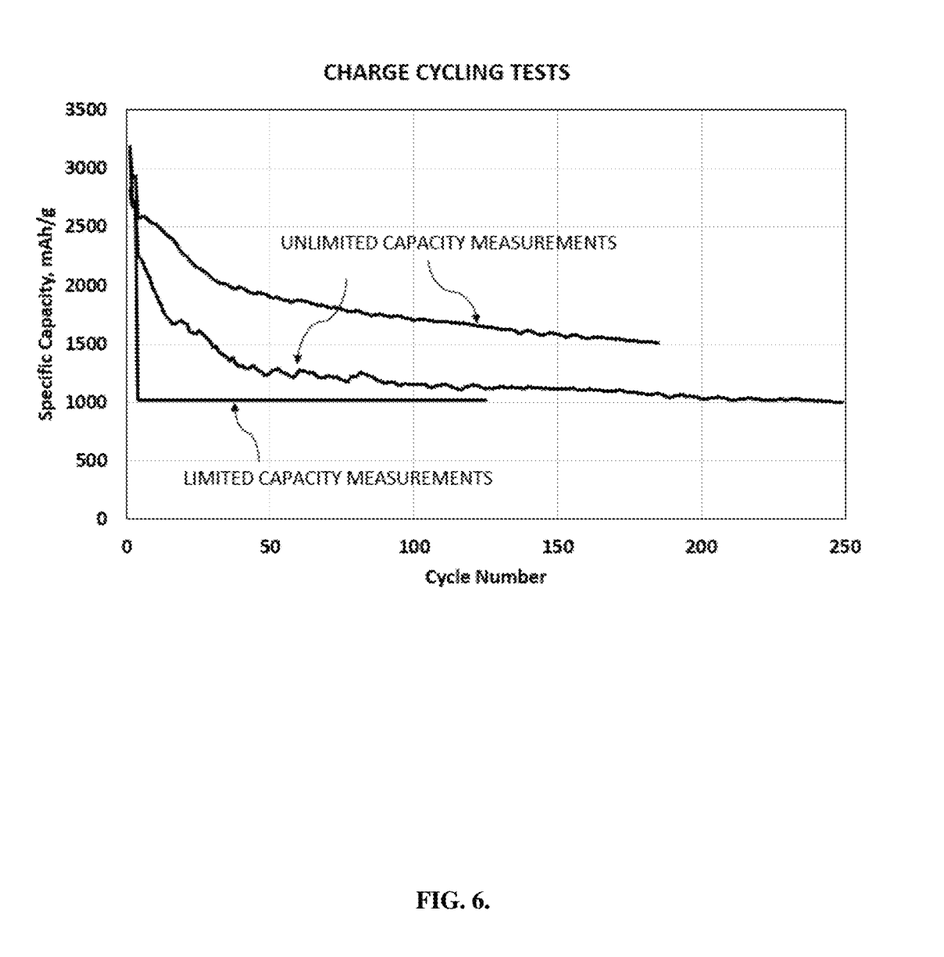

The 2016 type coin cells were then assembled in the glove box. The electrolyte used was 1M LiPF$_6$ in 1:1 ethylene carbonate (EC): dimethyl carbonate (DMC) (LP30, Merck). A fiberglass sheet (GF/A, Whatman) with a thickness of 260 μm served as a separator. Counter electrode was made of lithium metal (0.38 mm in thickness, Sigma-Aldrich). Cyclic voltammetry (CV) was measured with Autolab PGSTA302N. FIG. 6 shows the half-cell testing results with unlimited capacity (for two example samples) and limited capacity (1000 mAh/g) measurements.

In the Example 2, sheet-like porous silicon anode materials are prepared by mixing silicon particles, carboxymethyl cellulose (CMC), polyacrylic acid binders (PAA) and conductive carbon black (CB, C65, Timcal) in deionized water or solvents. The composition ratio is 60 wt. % of porous Si particles, 10 wt. % of CMC, 10 wt. % of PAA and 20 wt. % of CB. The prepared sheet electrode is then subsequently dried in vacuum or in air. Next, the electrodes are placed in a vacuum oven heated to 110° C. and left in the oven overnight. After cooling, the printed electrodes are moved to an argon filled glove box. The silicon loading in the electrodes can be either 1.0 to 1.1 mg/cm$^2$ for the rate capability measurements or 0.6 to 0.8 mg/cm$^2$ for the limited capacity cycling. The electrode thickness without copper foil is between 20 μm to 30 μm depending on the silicon mass loading.

The 2016 type coin cells were then assembled in the glove box. The electrolyte used was 1M LiPF$_6$ in 1:1 ethylene carbonate (EC): dimethyl carbonate (DMC) (LP30, Merck). A fiberglass sheet (GF/A, Whatman) with a thickness of 260 μm served as a separator. Counter electrode was made of lithium metal (0.38 mm in thickness, Sigma-Aldrich). Cyclic voltammetry (CV) was measured with Autolab PGSTA302N.

In the Example 3, conductive carbon nanotube (CNT)/graphitic carbon and sheet-like porous silicon powders are mixed with carboxymethyl cellulose, polyacrylic acid binders in solvent to make porous silicon anode pastes. The paste material can be processed with three roll mill to further reduce particle size and mix the ingredients. The paste is then printed onto a copper foil substrate using a coating machine or a screen printer.

In the Example 4, the following roll to roll process is used to densify the printed anode. An alternative hot-pressing approach may be used to densify silicon anode material with a hot press at 100° C. at a pressure of 5000 psi for 1 minute to 30 minutes. Then the anode is taken into a vacuum furnace for heat treatment. After the furnace is pumped down to a low pressure of less than 0.001 Torr, the anode is annealed in nitrogen or argon environment at 600° C. in furnace for 30 minutes.

In the Example 5, the sheet-like silicon powders are mixed with polymer, carbon nanotubes, and solvent to formulate silicon based Li ion battery anode pastes. Polymers can be chosen from carbonoxymethyl cellulose, polyimide, polyacrylonitrile, polyacrylic acid, polyvinylidene fluoride, or can be a combination of these polymers. The polymer is then dissolved in a solvent with a concentration from 5 wt. % to 40 wt. %, preferably 30 wt. %. The solvent can be chosen from N,N-dimethylformamide, dimethylacetamide, or other compatible solvents. Carbon nanotubes with a loading concentration from 0.02 wt. % to 2 wt. % are added to the mixture. The carbon nanotubes can be single-walled, double-walled, or multi-walled nanotubes. The paste mixture is then processed with a three roll mill to further reduce particle size and better mix the ingredients. The paste is then printed on a copper foil substrate using a coating machine to make a Li ion battery anode. The thickness of the coating layer can range from 20 μm to 40 μm such that an area density of the resulting silicon containing layer will range from 0.8 1.5 mg/cm$^2$ to 1.5 mg/cm$^2$.

The printed silicon based anode is then baked at 100° C. After baking, the prepared anode can be coated over the other side of the copper foil to make a double-sided silicon anode on the copper current collector. The anode is then taken into a vacuum furnace for a heat treatment. After the furnace is pumped down to less than 0.001 Torr, the anode is moved into the furnace hot zone for annealing in nitrogen or argon environment at high temperature in furnace for 15 to 30 minutes. During the heat treatment, the polymer binder is carbonized and converted into a conductive graphitic carbon material. Depending on the type of the polymer, the heat treatment temperature can be chosen from 500° C. to 1000° C. The polymer encapsulating a sheet-like silicon particle becomes a conductive carbon layer.

An interfacial adhesion layer between the silicon paste layer and the copper foil is formed during the high temperature heat treatment through an interdiffusion process. The interfacial layer, such as the formed copper silicide, makes a robust adhesion of silicon anode layer onto the copper foil current collector, preventing the silicon layer detachment from copper foil during battery charge/discharge cycles.

Figure 7:
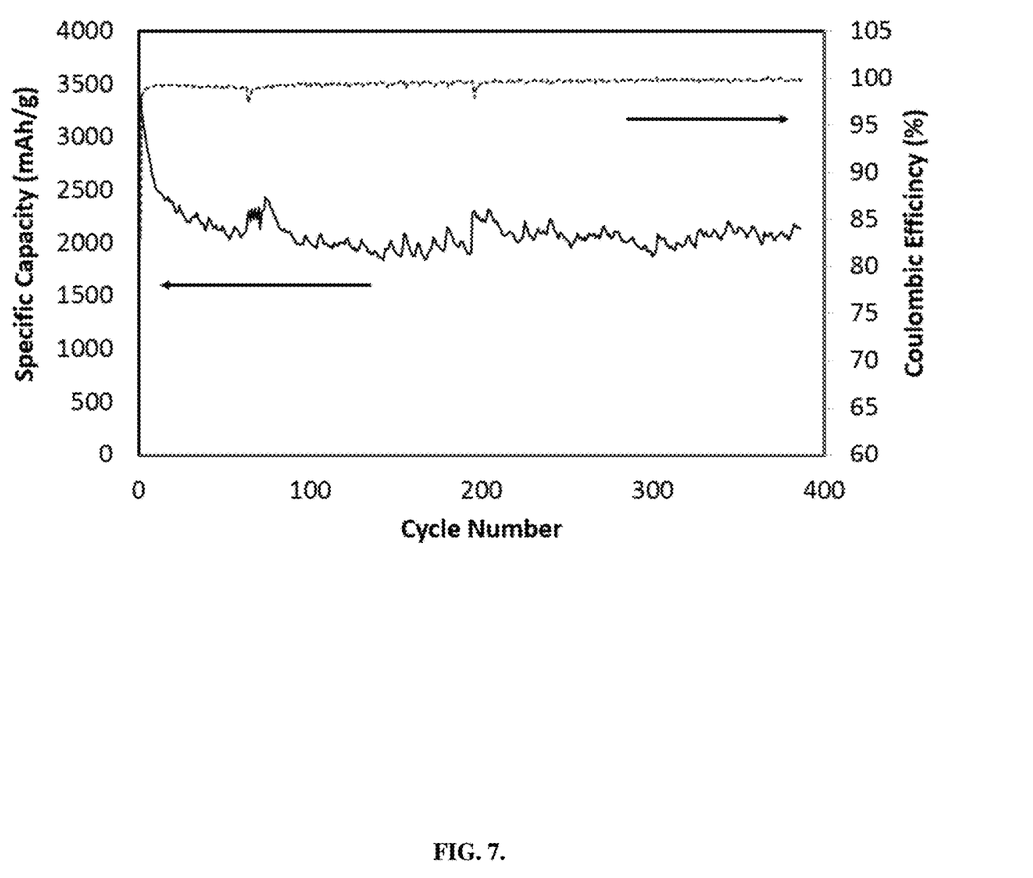

After the heat treatment, the anode is assembled in the glove box with the 2016 type coin cell. The electrolyte used was 1M LiPF$_6$ in the 1:1 ethylene carbonate (EC): dimethyl carbonate (DMC) (LP30, Merck) solution. A fiberglass sheet (GF/A, Whatman) with a thickness of 260 μm served as a separator. Counter electrode was made of lithium metal (0.38 mm thickness, Sigma-Aldrich). Cyclic voltammetry (CV) was measured with Autolab PGSTA302N. FIG. 7 shows long term cycling stability of the fabricated sheet-like silicon anode.

DESCRIPTION OF DRAWINGS

FIG. 4. Example of a layered structure of Li ion battery anode
FIG. 5. Silicon particle with carbon nanotubes protruding from the particle surface
FIG. 6. Half-cell test results for unlimited capacity and limited capacity measurements
FIG. 7. Long term cycling stability of anode with sheet-like silicon particles

The invention claimed is:

1. A method of making a porous silicon battery anode material composition comprising:
    (a) preparing at least one two-dimensional silicon sheet powder wherein at least one powder or a slurry of a doped silicon is exposed to high shear forces, and a solvent is mixed with said powder or said slurry of said doped silicon to form the at least one two-dimensional silicon sheet powder;
    (b) chemically etching the at least one two-dimensional silicon sheet powder to create multiple sheet pores within at least one particle of said at least one two-dimensional silicon sheet powder;
    (c) preparing an anode paste wherein said at least one two-dimensional silicon sheet powder, at least one polymer, and at least one solvent are mixed to form the anode paste;
    (d) coating the prepared anode paste on a copper layer; and
    (e) exposing the coated copper layer to high temperatures in an inert gas environment, wherein the high temperature exposure step (e) results in at least one particle of the at least one polymer forming a conductive graphitic matrix encapsulating at least one particle of said at least one two-dimensional silicon sheet powder, and wherein the porous silicon battery anode material composition includes at least one pore, where the at least one pore has a diameter between 2 to 50 nanometers.

2. The method as in claim 1, wherein the at least one polymer is selected from the group consisting of carboxymethyl cellulose, polyimide, polyacrylonitrile, polyacrylic acid, polyvinylidene fluoride, and combinations thereof.

3. The method as in claim 1, wherein the anode paste further comprises carbon nanotubes at an amount between 0.02% and 2.00% of said anode paste by weight.

4. The method as in claim 1, wherein the temperature of the high temperature exposure step (e) ranges from 500° C. to 1000° C.

5. The method as in claim 1, wherein the porous silicon battery anode material composition has a resistance ranging from 1Ω to 1500Ω.

6. The method as in claim 1, wherein the said anode paste is comprised between 10% and 90% by weight of two-dimensional silicon sheet powder.

7. The method as in claim 1, further comprising the formation of an interfacial adhesion layer between said anode paste and said copper layer during the high temperature exposure step (e) via interdiffusion.

8. A method of making a battery anode material composition comprising a porous silicon layer, the porous silicon layer having a thickness not to exceed 150 nm, wherein the porous silicon layer is generated from at least one doped silicon, wherein the at least one doped silicon comprises silicon particles bonded to at least one dopant material, the dopant material being selected from the group consisting of phosphor, boron, and gallium elements, wherein the dopant material is present at an amount of between $10^5$ to $10^{21}$ atoms per cubic centimeter of the porous silicon layer, and wherein the porous silicon layer has a diameter between 2 to 50 nanometers, for accommodating lithium ions during lithiation, and wherein said method of making the battery anode material composition include the steps of:
    (a) preparing at least one two-dimensional silicon sheet powder wherein at least one powder or a slurry of the doped silicon is exposed to high sheer forces, and a solvent is mixed with said powder or slurry of the doped silicon to form the two-dimensional silicon sheet powder; (b) chemically etching the at least one two-dimensional silicon sheet powder to create multiple flake pores within said at least one two-dimensional silicon sheet powder; (c) preparing an anode paste wherein said at least one two-dimensional silicon sheet powder, at least one polymer, and at least one solvent are mixed to form the anode paste; (d) coating the prepared anode paste on a copper layer; and (e) exposing the coated copper layer to high temperatures in an inert gas environment, wherein the high temperature exposure step (e) results in at least one particle of the at least one polymer forming a conductive graphitic matrix encapsulation with said at least one of two-dimensional silicon sheet powder.

9. The method of making a battery anode material composition of claim 8, wherein the two dimensional silicon sheet powder is at least one monocrystalline silicon powder prepared by ball milling.

10. The method of making a battery anode material composition of claim 9, wherein said monocrystalline silicon has an electrical resistivity less than 100 Ω·cm.

11. The method of making a battery anode material composition of claim 8, wherein the two dimensional silicon sheet powder is a polycrystalline silicon powder produced by ball milling.

12. The method of making a battery anode material of claim 11, wherein said polycrystalline, silicon has an electrical resistivity of less than 100 Ω·cm.

13. The method of making a battery anode material of claim 8, wherein the porous silicon layer have lateral and longitudinal dimensions wherein the lateral dimension of the porous layer is less than 2 micrometers.

14. The method of making the battery anode material of claim 8, further comprising a high-temperature polymer precursor carbonized layer, wherein the carbonized layer encapsulates said two dimensional silicon sheet power particles.

15. The method of making the battery anode material of claim 8, wherein said silicon layer pores are carbonized.

16. The method of making the anode material of claim 8, further comprising carbon nanotubes in an amount between 0.02-2.00 percent by weight within said silicon layer pores.

17. The method of making the anode material of claim 8, wherein said two dimensional silicon sheet powder further includes metallic particles in an amount between 5-30% by weight.

18. The battery anode composition prepared by the process of claim 8.

* * * * *